US005739509A

United States Patent [19]

Watanabe

[11] Patent Number: 5,739,509

[45] Date of Patent: Apr. 14, 1998

[54] AUTOMATIC TELLER MACHINE EMPLOYING JAM CHECK SHEET FOR CLEANING PAPER MONEY CONVEYOR ROUTE AND OPERATION METHOD FOR SAME

[75] Inventor: Kohichi Watanabe, Tokyo, Japan

[73] Assignee: NEC Corporation, Tokyo, Japan

[21] Appl. No.: 578,137

[22] Filed: Dec. 26, 1995

[30] Foreign Application Priority Data

Dec. 26, 1994 [JP] Japan .................................... 6-323012

[51] Int. Cl.[6] ............................ G06F 17/60; G06K 13/00

[52] U.S. Cl. .......................... 235/379; 235/475; 291/193; 291/264; 15/1.51

[58] Field of Search .................................... 235/379, 475; 271/193, 208, 18.2, 264, 105, 258.01, 259, 265.01, 265.02; 15/104.13, 210.1, 1.51

[56] References Cited

FOREIGN PATENT DOCUMENTS 4-43486 2/1992 Japan .

*Primary Examiner*—Donald T. Hajec
*Assistant Examiner*—Douglas X. Rodriguez
*Attorney, Agent, or Firm*—Foley & Lardner

[57] ABSTRACT

A teller member for telling a paper money incomming from outside or outgoing from inside and a safe member for storing therein and/or supplying therefrom the paper money are connected to each other by a conveyor route which is composed of a money conveyor for conveying the paper money therebetween and a route member for enclosing the money conveyor and provided with a check sheet member conveyable by the money conveyor for checking the conveyor route for a jam, the check sheet member being chargeable with polarity-controlled electricities so that dust such as paper dust in the conveyor route is adorbed by the check sheet member, as it is charged with electricities of a certain polarity and conveyed by the money conveyor, before the check sheet member is unloaded from the money conveyor into an accommodation chamber, where it is charged with electricities of an opposite polarity, thereby releasing the dust to be blown into a dust collector.

9 Claims, 4 Drawing Sheets

AUTOMATIC TELLER MACHINE EMPLOYING JAM CHECK SHEET FOR CLEANING PAPER MONEY CONVEYOR ROUTE AND OPERATION METHOD FOR SAME

BACKGROUND OF THE INVENTION

The present invention generally relates to an automatic teller machine (hereafter sometimes "ATM") and an operation method therefor, and particularly, to an ATM in which a jam checking sheet member (hereafter simply "check sheet") travels a paper money conveyor route (hereafter simply "conveyor route"), checking for a potential jam such as due to a piece or sheet of bill, note or some other paper money (hereafter collectively "paper money" or simply "money" or "note") left therein, and to an operation method for the same.

Description of the Related Art

ATMs have a variety of measures for avoiding a mismatch in money count.

As a countermeasure to such a count mismatch, a typical type of conventional ATM includes a mechanism for acknowledgment of a jam-free state, which mechanism is operable, in response to a check start command from an automatic retry system which may have restored a conveyor route having suffered from (a) note jam(s) or by a service person who may have removed such a jam, to insert a check sheet into a paper money conveyor (hereafter simply "money conveyor") so that the check sheet travels therewith along a total length of the conveyor route, checking this for a potential jam such as due to a note that may occasionally be left therein after a retry operation or a removal service.

Most conventional ATMs of such the type include a paper money discriminator with appropriate sensors such as a magnetic sensor, and a cleaning system for cleaning the sensors, e.g. as disclosed in the Japanese Patent Application Laid-Open Publication No. 4-43486.

However, even in the conventional ATMs of this type, the check sheet is composed of a mere sheet of paper cut in an equivalent size to a paper money and is simply employed to check a conveyor route for a potential jam after a retry operation or a removal service. As a matter of course, such a mere sheet of paper could not have cleaned a conveyor route of dust, in particular of paper dust or the like that tends to cause an erroneous operation of a photo-sensor provided in the conveyor route for detecting a paper money passing by.

The present invention has been achieved with such points in mind.

SUMMARY OF THE INVENTION

It therefore is an object of the present invention to provide an automatic teller machine and an operation method therefor, in which a check sheet member is employed for cleaning a paper money conveyor route of dust, in particular of paper dust, permitting a reduced error rate in money pass detection and the more increased reliability of operation, in a case a route member is provided with a photo-sensor for the detection.

To achieve the object, a genus of the present invention provides an automatic teller machine comprising: a teller member for telling a paper money consisting of one of a first money incomming from outside the machine and a second money outgoing from inside the machine; a safe member composed of one of a first safe for storing therein the paper money and a second safe for supplying therefrom the paper money; a conveyor route composed of a money conveyor for conveying the paper money between the teller member and the safe member, and a route member for enclosing the money conveyor; a check sheet member conveyable by the money conveyor for checking the conveyor route for a jam; and a charge circuit for charging the check sheet member with a quantity of electricities.

According to the genus of the invention, in an acceptance or repayment oriented ATM, a check sheet member is adapted for attracting to adsorb dust from therearound, as it is charged, and can effectively serve for cleaning a conveyor route of dust, in particular of paper dust, as it is conveyed by a money conveyor, thus permitting a reduced error rate in money pass detection and the more increased reliability of operation, in the case a route member is provided with a photo-sensor for the detection.

According to a species of the genus of the invention, the automatic teller machine further comprises a loader for loading the check sheet member on the money conveyor, and an unloader for unloading the check sheet member from the money conveyor, the charge circuit charges the check sheet member with the quantity of electricities having a first polarity before the loader loads the check sheet member on the money conveyor so that the check sheet member travels the conveyor route, and the unloader unloads the check sheet member from the money conveyor before the charge circuit charges the check sheet member with the quantity of electricities having a second polarity opposite to the first polarity.

Moreover, to achieve the object, another genus of the present invention provides an automatic teller machine comprising: a money placement member operative for placing thereon a first paper money incomming from outside of the machine; a money discriminator operative for executing a first combination of decisions on a genuineness and a kind of the first paper money to identify the first paper money as a second paper money reservable in the machine; a safe member for keeping therein the second paper money as a reserved paper money pickable as a third paper money; the money discriminator being further operative for executing a second combination of decisions on a genuineness and a kind of the third paper money to identify the third paper money as a fourth paper money available for a delivery to outside the machine; a first hold member for temporarily holding therein the fourth paper money as a fifth paper money secured for the delivery; a second hold member for holding therein the fifth paper money as a sixth paper money put in order for the delivery; the money placement member being further operative for placing thereon the sixth paper money to effect the delivery; a conveyor route composed of a money conveyor for conveying the first paper money from the money placement member to the money discriminator, the second paper money from the money discriminator to the safe member, the third paper money from the safe member to the money discriminator, the fourth paper money from the money discriminator to the first hold member, the fifth paper money from the first hold member to the second hold member and the sixth paper money from the second hold member to the money displacement member, and a route member for enclosing the money conveyor; a check sheet member conveyable by the money conveyor for checking the conveyor route for a jam; a sheet accommodation member for accommodating therein the check sheet member; a charge providing means for providing charges to the check sheet member in the sheet accommodation member;

and a loading member for loading the check sheet member from the sheet accommodation member to the money conveyor.

According to this genus of the invention, in an ATM for an overall transaction, a charged check sheet member works to adsorb dust from therearound, thereby serving for cleaning a conveyor route of dust, in particular of paper dust, as it is conveyed by a money conveyor, thus permitting a reduced error rate in money pass detection and the more increased reliability of operation, in the case a route member is provided with a photo-sensor for the detection.

According to a species of this genus of the invetion, the automatic teller machine further comprises an unloading member for unloading the check sheet member from the money conveyor into the sheet accommodation member, and a charge cancelling means for cancelling the charges of the check sheet member.

According to an individual of this species of the invetion, the automatic teller machine further comprises a blower for blowing dust off from the check sheet member, as it is unloaded from the money conveyor, and a dust collector for collecting the blown dust. The collector may be disposed at one side of the check sheet member, as the blower is arranged at an opposite side thereof.

According to another individual of this species of the invetion, the charge cancelling means comprises a sweep member for sweeping a surface of the check sheet member, and a control circuit for providing the sweep member with a quantity of polarity-controlled charges.

According to this individual of the concerned species of the invetion, the charge providing means may comprise the charge cancelling means.

Further, to achieve the object, another genus of the present invention provides an operation method for an automatic teller machine including a teller member for telling a paper money consisting of one of a first money incomming from outside the machine and a second money outgoing from inside the machine, a safe member composed of one of a first safe for storing therein the paper money and a second safe for supplying therefrom the paper money, and a conveyor route composed of a money conveyor for conveying the paper money between the teller member and the safe member and a route member for enclosing the money conveyor, the operation method comprising the steps of: having a check sheet member conveyable by the money conveyor for checking the conveyor route for a jam; and charging the check sheet member with a quantity of electricities.

According to a species of this genus of the invention, the charging step comprises the steps of: charging the check sheet member with the quantity of electricities having a first polarity; loading the check sheet member on the money conveyor so that the check sheet member travels the conveyor route; unloading the check sheet member from the money conveyor; and charging the check sheet member with the quantity of electricities having a second polarity opposite to the first polarity.

According to the foregoing genera of the invention, a check sheet member, which is conveyable along a money conveyor route for a check for a jam therein and hence available, as a countermeasure to a count mismatch after a jam removal service or retry, for checking the route for a potential jam due to a residual note, can concurrently serve for cleaning the conveyor route of dust, in particular of paper dust.

The check sheet member may be a sheet of paper or other electrically chargeable medium cut in an equivalent size to a paper money.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
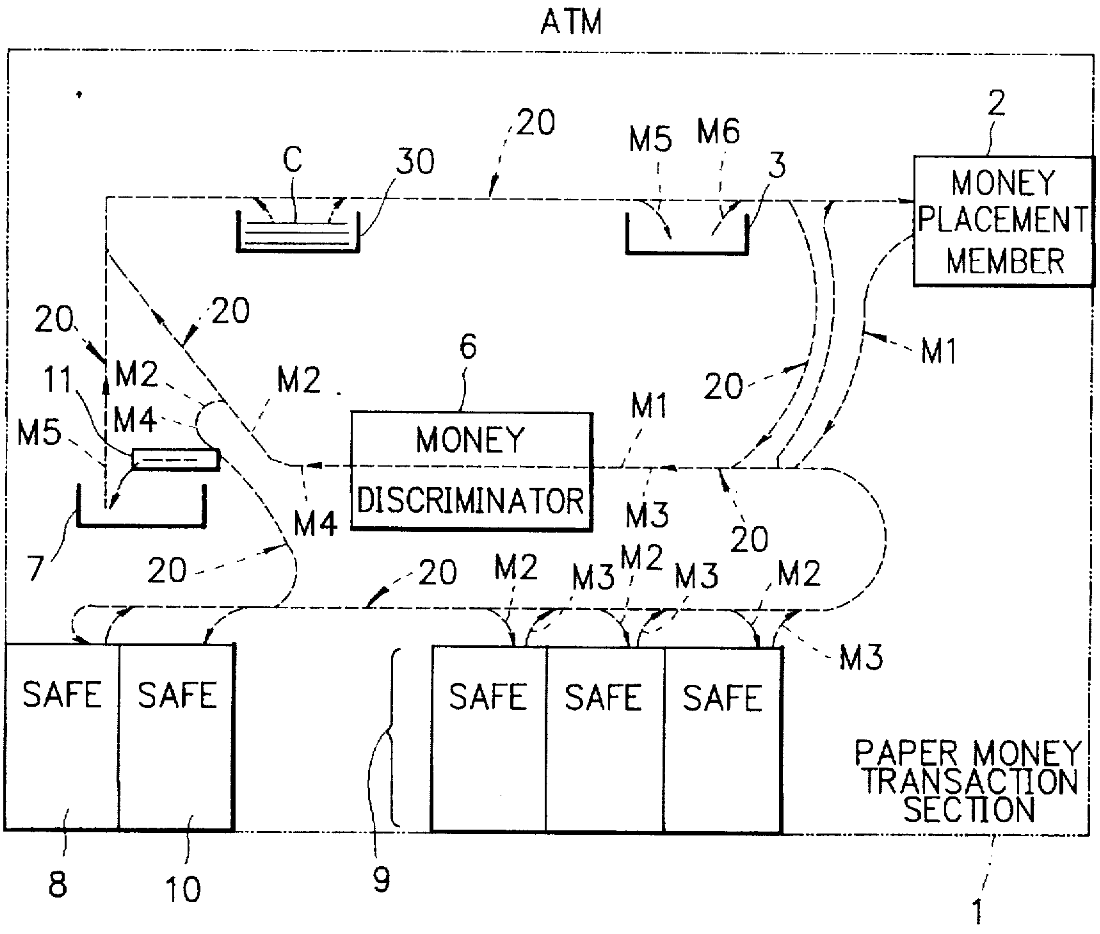
FIG. 1 is an illustration describing an arrangement of an ATM according to an embodiment of the invention.

Preferred embodiments of the present invention will be described below with reference to the accompanying drawings. Some members are each called by different names in consideration of a variety of probable modifications, but like members are designated by like reference characters.

FIG. 1 shows a conceptual elevation of a multi-purpose ATM according to an embodiment of the invention.

The ATM comprises a paper maney transaction section 1, an unshown hard money transaction section, an unshown card and/or bankbook transaction section, and an unshown data processing section coupled to the paper money, hard money and card/bankbook transaction sections and communicating in a real-time accessible manner with an unshown on-line network between registered banks. The data processing section comprises a CPU, memories, etc and serves to govern the respective sections and respond to or provide any and all later-described commands or signals, as necessary.

The paper money transaction section 1 comprises a money placement member 2 as a teller member for placing thereon (a) paper money(s) incomming, e.g. for a deposit, from outside the ATM or outgoing, e.g. for a withdrawal, to outside the ATM, a paper money hold member 3 as another teller member for putting in order to temporarily hold (a) repayable paper money(s) sent thereto from inside the ATM, and another paper money hold member 7 as still another teller member for temporarily holding to secure (a) repayable paper money(s) in an arranged manner with right side (or wrong side) up to be sent to the hold member 3. Designated at reference character 11 is a money side arranger as an auxliary teller member provided at an entry of the hold member 7.

The paper money transaction section 1 further comprises a triple of money-recycling safes 9 for keeping therein an amount of reserved paper moneys available for any repayment acknowledged or permitted by the processor section to supply therefrom (a) probable paper money(s) to be individually discrimininated as (a) repayable paper money(s) to be sent to the hold member 7, and a money discriminator 6 as yot another teller member for a combination of decisions on a genuineness, a kind, etc. of each paper money on a way from one of the safes 9 or from an auxiliary safe 8 (directly or indirectly [i.e. via 9]) or sometimes from the hold member 3 (when so operated) to the hold member 7, when the money is repayable, to a rejected-money keeping safe 10, when the money is rejected by the discriminator 6, or to one of the safes 8 and/or 9, when the money is reservable or when so operated, as well as for a combination of decisions on a genuineness, a kind, etc. of each paper money on a way from the money placement member 2 or sometimes from the hold member 3 (when so operated) to one of the safes 8 and/or 9, when the money is reservable, or to the hold member 3, when the money is rejected by the discriminator 6 or when necessary to return to the money placement member 2. Arrows in FIG. 1 indicate flow directions of money. Foreign objects may be directly returned to the member 2 or otherwise expelled outside, before entering the discriminator 6.

In other words, the ATM of FIG. 1 comprises: a money placement member 2 operative for placing thereon a first paper money M1 incomming from outside of the machine; a money discriminator 6 operative for executing a first combination of decisions on a genuineness and a kind of the first paper money M1 to identify the first paper money M1 as a second paper money M2 reservable in the machine; a safe member 9 for keeping therein the second paper money M2 as a reserved paper money pickable as a third paper money M3; the money discriminator 6 being further operative for executing a second combination of decisions on a genuineness and a kind of the third paper money M3 to identify the third paper money M3 as a fourth paper money M4 available for a delivery to outside the machine; a first hold member 7 for temporarily holding therein the fourth paper money M4 as a fifth paper money M5 secured for the delivery; a second hold member 3 for holding therein the fifth paper money M5 as a sixth paper money M6 put in order for the delivery; and the money placement member 2 being further operative for placing thereon the sixth paper money M6 to effect the delivery.

The teller members 2, 3, 6, 7, 11 and the safes 8, 9, 10 are interconnected by a synchronous money conveyor route 20, as well as between the teller members 2, 3, 6, 7, 11 and between the safes 8, 9, 10.

The conveyor route 20 may be a continous circuit with branches or a combination of discrete routes, which may be cooperative on the one hand with each other and on the other hand with an unshown combination of a loader, such as a pickup mechanism, and an unloader, such as a pickdown mechanism, provided at each teller member or safe, so that any acceptable object can be sequentially and synchronously conveyed along the conveyor route.

Figure 2:
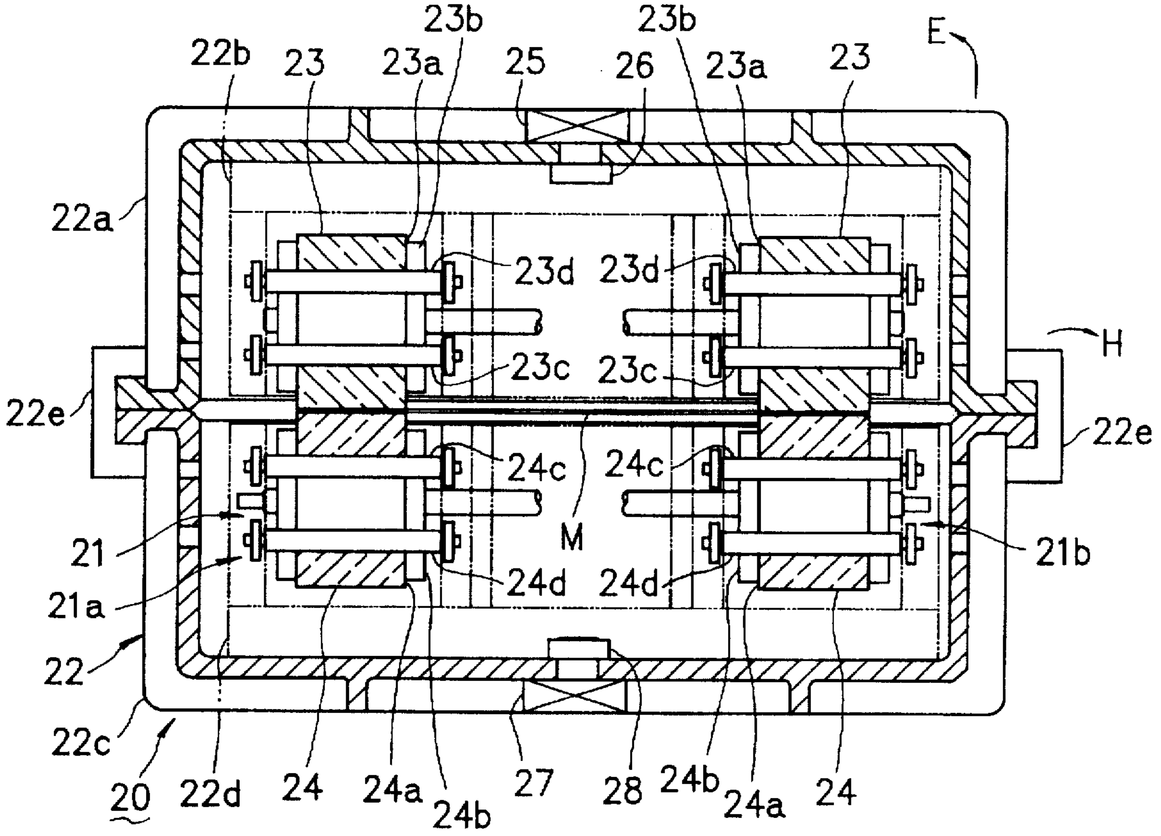
FIG. 2 is a cross sectional view of a money conveyor route of the ATM of FIG. 1.

FIG. 2 shows a transverse section of the money conveyor route 20.

The conveyor route 20 comprises a number of interconnected route units each respectively composed of a separate type money conveyor 21 and a separate type support structure 22 as a route member or combination of route members for supporting and substantially totally enclosing to protect the money conveyor 21.

The conveyor 21 comprises a left belt conveyor **21*a*, a right belt conveyor 21*b*** and an unshown conveyor drive system such as a combination of a step motor, a reduction, drive shafts, wheels, etc.

The left belt conveyor **21*a* as well as the right belt conveyor 21*b* comprises an upper conveyor belt 23 and a lower conveyor belt 24, which are composed of endless resin caterpillars 23*a* and 24*a*, drive wheels 23*b* and 24*b*, unshown driven pulleys, arrays of press rollers 23*c* and 24*c*, and arrays of tension and idle rollers 23*d* and 24*d***, respectively.

In the left belt conveyor **21*a* as well as in the right belt conveyor 21*b*, as they are running in a route unit, the caterpillars 23*c* and 24*c* of the upper and lower conveyor belts 23 and 24** faces each other along lengths at their forward sides, with a severe controlled clearence left therebetween for catching to draw therein at a tail end of the unit a corresponding long side of a tensioned paper money M comming ahead from a connected route unit or likewise inserted by a loader.

The support structure 22 comprises an upper enclosure **22*a* with an upper inner frame 22*b* having the left and right upper conveyor belts 23 fixed thereto, a lower enclosure 22*c* with a lower inner frame 22*d* having the left and right lower conveyor belts 24 fixed thereto, and left and right hook or binding members 22*e*. A hook removal, e.g. along a direction H, permits the upper enclosure 22*a* to be swung up, e.g. in a direction E, or otherwise to be removed together with the inner structure 22*b* and the left and right upper conveyor belts 23, thus leaving the left and right lower conveyor belts 24** upwardly opened, permitting a maintenance service thereto.

The upper enclosure **22*a* includes a wiring conduit 25 and an array of electroluminescent projectors 26** connected thereto.

The lower enclosure **22*c* includes a wiring conduit 27 and an array of photo sensors 28 connected thereto. Each photo sensor 28 is aligned in identified position to receive a beam of light projected from a corresponding projector 26**, and is responsible for a beam of incident light to output a pulse signal, which is employed for a money count as well as for error or trouble indications including a display of note jamming locations.

The sensor array has a critical sensor density designed in consideration of probable kinds and deformations of acceptable objects.

Any photo sensor 28 receives a beam of light projected from a corresponding projector 26 with an interruptable object absent therebetween, but does not with an interrupting object present therebetween. Some torn pieces of note may be interruptable, and some others may not.

In most cases of a route jamming, an automatic trouble shooting system or an automatic route recovery system works to forcibly retry a money forwarding operation, thereby recovering the conveyor route 20, while any forwarded money is put in the reject safe 10, unless it is an incomming money from outside.

In some cases, a service person is called to manually remove a jamming object, as a jammed location is displayed. The service person may press a manual retry command switch.

As the ATM may occasionally experience a severe earthquake, undue shock or vibration or a malignant trick such as by an artificial foreign object, the route 20 may suffer a jam such as due to a torn piece or slipped out note or by a foreign object. Such the jam may occur at an unexpected place or places in an unexpectedly small or large scale, and may happenedly be left after a retry operation or even after a jam removal by a service person. Moreover, a detection system might have detected a false jam.

In this respect, the ATM of FIG. 1 has a check sheet C composed of a sheet of paper or other electrically chargeable medium cut in an equivalent size to a probable biggest note. The check sheet C may have a thickness substantially equivalent to that of a card such as a business card. Further, it may be coated with a charge assisting agent.

The check sheet C may comprise a multi-layered structure reinforced along periphery, e.g. a reiforced combination of a top-coated upper paper layer and a bottom-coated lower paper layer having an intermediate solid, liquid or gaseous (air-inclusive) insulating layer put therebetween.

More specifically, the ATM includes a chamber member 30 engageable with the conveyor route 20 between the money hold members 7 and 3. The chamber member 30 has accommodated therein one or more piled check sheets C.

Figure 3:
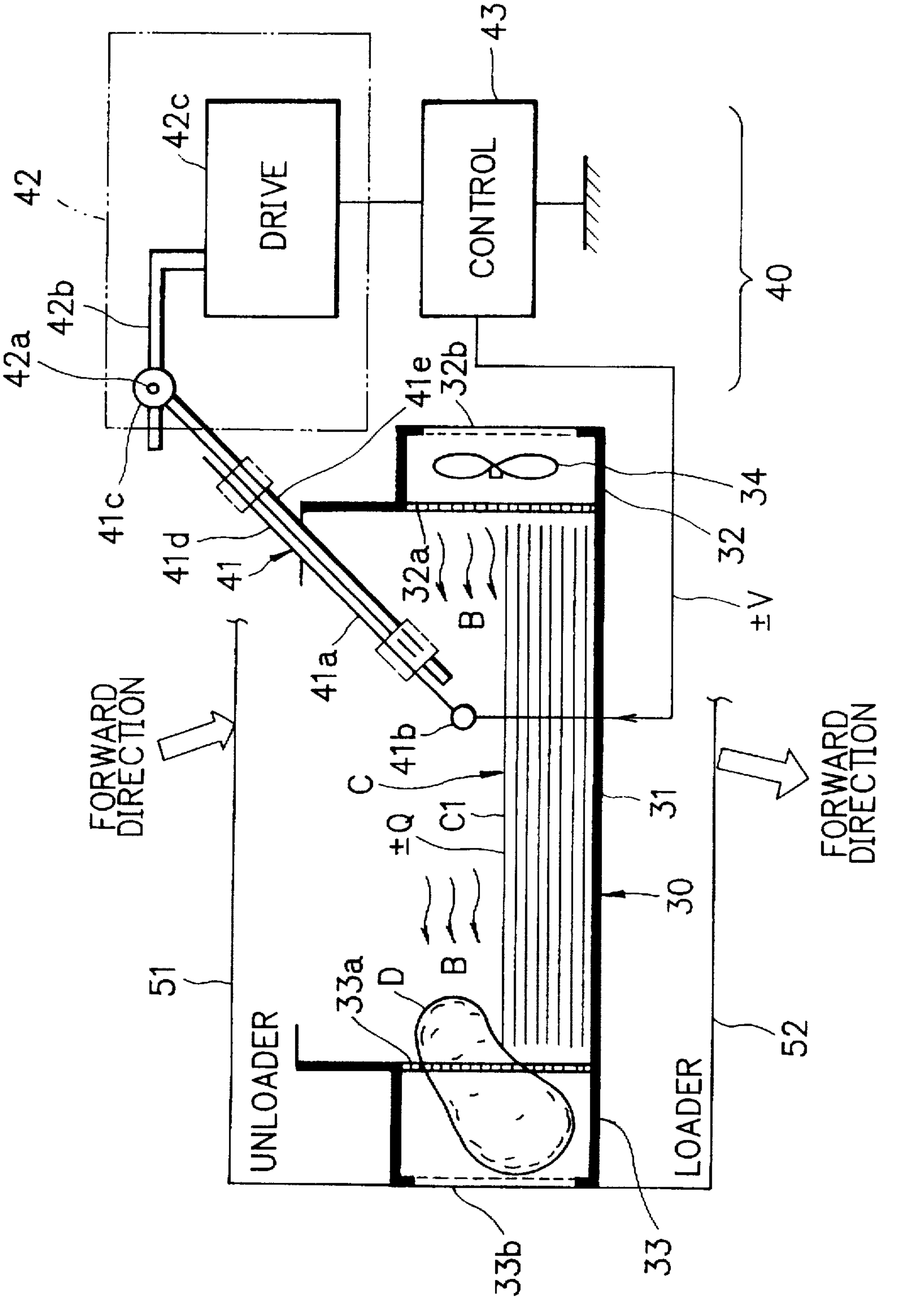
FIG. 3 is a schematic sectional view showing a sheet accommodation chamber with a charge circuit in the ATM of FIG. 1.

FIG. 3 shows a section of the chamber member 3O and associated members.

As shown in FIG. 3, the chamber member 30 comprises a central accommodation chamber 31 for accommodating therein the piled check sheets C, a blower chamber 32 with an air outlet opening 32a facing length of a right long side of at leat a top one C1 of the check sheets C, and a dust collection chamber 33 with an air inlet opening 33a facing length of a left long side of at leat the top one C1 of the check sheets C. The blower chamber 32 has a wire-meshed air inlet opening 32b communicating with an unshown fresh air source. The dust collection chamber 33 has a wire-meshed air outlet opening 33b thereof connected to an unshown exhaust duct.

The blower chamber 32 is equipped with an air blower or fan 34 operable to send air blows B from the opening 32a of the blower chamber 32 toward the opening 33a of the dust collection chamber 33, to blow off dust D on or over the top sheet C1 into the chamber 33.

The chamber member 30 is provided with a charging mechanism 40 composed of a sweep member 41, a drive mechanism 42 and a control circuit 43.

The sweep member 41 comprises a telescopic arm 41a flexible of extension and contraction, an electrically insulated sweeper 41b composed of a roller having a width substantially equivalent to a long-side length of the check sheet C and responsible to a weight of the arm 41a for rolling forward and back to sweep an entire front surface of the top sheet C1, and a pivotable top end 41c.

The sweep member 41 is operable in one of a free pendnig mode and a compulsory mode switchable therebetween by an unshown remote controllable select switch in the drive mechanism 42. In the free pending mode, the arm 41a is put in a free state so that the sweeper 41b is kept in contact with the top sheet C1 unless the arm 41a hits or rides on a side wall of the chamber member 30. In the compulsory mode, the top end 41c is gear-engaged and a slide portion 41d of the arm 41 is controlled of a relative position to an arm body 41e so that the arm 41 has a length and/or an angular position thereof forcibly regulated in accordance with a signal from the control circuit 43.

The drive mechanism 42 comprises a pivot 42a engaging the top end 41c of the sweep member 41, a horizontal slider 42b carrying the pivot 42a, and a motor-driven drive 42c for controlling a slide motion of the slider 42b.

The control circuit 43 supplies necessary control signals for operations associated with the chamber member 30, and is further operative to supply the sweeper 41b with positive charges or negative charges so that the sweeper 41b in contact with the top sheet C1 charges the top sheet C1 with positive electricities +Q or negative electricities −Q, respectively, or that the sweeper 41b held at a distance from the top sheet C1 induces negative electricities −Q or positive electricities +Q on the top sheet C1.

In a charge operation under the free-pending mode, the sweeper 41b may be kept biased to a positive potential, and the slider 42b may be shifted from a left-most position where the arm 41a has a retracted upright position to a right-most position where the arm 41a has a fully extending declined position.

In a discharge operation under the free-pending mode, the sweeper 41b may be kept biased to a negative potential.

In a charge operation under the compulsory mode, the sweeper 41b may be kept biased to a negative potential, and the arm body 41e may be swung with the slide portion 41d synchronously sliding up and down to hold the sweeper 41b at a constant level.

In a discharge operation under the compulsory mode, the sweeper 41b may be kept biased to a positive potential.

In the compulsory mode also, the sweeper 41b may be brought into contact with the top sheet C1.

One of applicable combinations between a mode selection and a polarity selection is anytime instructed from the CPU of the ATM to the control circuit 43, so that the charging mechanism 40 can serve, on the one hand, as a charge providing means for providing the top sheet C1 with a quantity of charges of a positive or negative polarity, and on the other hand, as a charge cancelling means for cancelling the charges on the top sheet C1 by providing a quantity of charges of an opposite polarity or as a charge removing means for removing charges from the top sheet C1, or a charge neutralizing means.

The chamber member 30 is further provided with a loader 50 for picking up a bottom one of the piled check sheets C to load it on an associated conveyor route unit, and an unloader 51 for picking down to unload a check sheet C from an associated conveyor route unit, as the top sheet C1. The chamber member 30 may be installed between any pair of neighboring conveyor route units. The loader 50 and the unloader 51 may comprise conventional pickup and pick-down devices.

The loader 50 and the unloader 51, as well as respective route units, are provided with considerations not to change the charged state of loading or unloading check sheet C, by using an appropriate insulating material for a picking, holding or conveying member.

Figure 4:
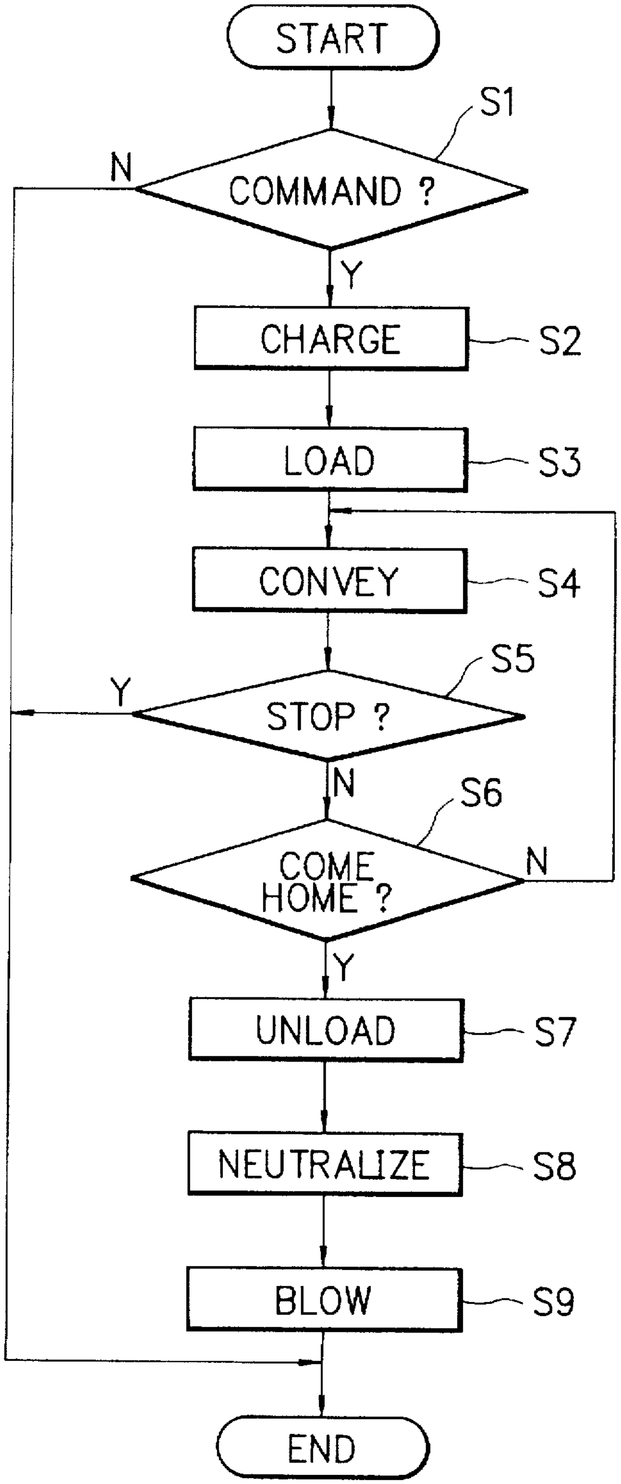
FIG. 4 is a flow chart of control actions associated with a service of a check sheet in the ATM of FIG. 1.

FIG. 4 describes a sequence of control actions associated with a check sheet C.

A decision step S1 checks if a route check command is given from the automatic route recovery system, as it has completed a retry operation, or by a service person who has completed a jam removal. The route check command may be issued from the CPU in response to a route cleaning request from some other system.

If the command is not given, the control flow goes to an end.

If the command is given, the flow goes to a subsequent step S2.

At the step S2, a lowermost one of piled check sheets C in the sheet accommodation chamber 31 is picked off and put as the top sheet C1 on an uppermost check sheet, by an unshown picking member of the loader 50, before the top check sheet C1 is charged with a quantity of electricities of a polarity, as the sweeper 41b rolls from the right long side to the left long side of the sheet C1, under control of the control circuit 43.

Then, at a subsequent step S3, the loader 50 loads the top check sheet C1 into an associated route unit.

As an entirety of the piled sheets C is concurrently charged, a bottom sheet may be directly loaded into the route unit.

At a subsequent step S4, the loaded check sheet C is conveyed like a paper money along the conveyor route 20, checking the route 20 for a potential jam such as due to a residual note, concurrently cleaning the route 20 of dust, in particular of paper dust, as the charged electricities attract to adsorb such dust from around the check sheet C.

If the routing check sheet C hits a jammable object, the conveyor 21 responds to a resultant reaction force to stop running, generating a conveyor stop signal.

A subsequent decision step S5 checks if a conveyor stop signal is detected.

If it is detected, the flow goes to an end, before the recovery system issues a maintenance request signal or the service person enters a repeated jam removal service.

If it is not, the flow goes to a subsequent decision step S6.

The decision setp S6 checks if the routing check sheet C has come home to an unloading position vicinal to a loading position where it was loaded.

If it has not yet come home, the flow goes to the step S4.

If it has come home, the flow goes to a subsequent step S7, where the check sheet C conveyed home is unloaded into the sheet accommodation chamber 31, as the top sheet C1.

Then, at a subsequent step S8, the top sheet C1 is charged with a quantity of electricities of an opposite polarity so that the charges given at the step S2 are now cancelled or neutralized, i.e. removed, releasing dust on the sheet C1 free therefrom.

At a subsequent step S9, the blower 34 starts sending blows B so that the dust is blown into the dust collection chamber 33, as the dust D to be disposed of.

A description of a simple case follows.

In a paper money transaction by the ATM, if an erroneous sensing or a paper money jam occurs in the conveyor route 20, the automatic route recovery system first tries to restore the route 20 by a retry operation, which assures a recovery in the case of erroneous sensing. The reject safe 10 receives forwarded money, as it has been sent from the recycle safes 9.

Thereafter, a charged check sheet C is sent from the sheet accommodation chamber 31 toward the money placement member 2 to check the conveyor route 20 for a residual money, while cleaning the route by electrically adsorbing dust therein.

If the check sheet 5 returns home without troubles, it is confirmed that no paper money is left in the route 20. The ATM performs a substantially continuous transaction, paying requested money, updating a ledger of a host computer, completing associated services.

If the check sheet C hits a jamming object, the ATM stops. A called service person removes the object, takes necessary measures for a match to a ledger of a host computer, and resets the ATM for a restart. Then, like the case of a retry, a charged check sheet C goes round the conveyor route 20, checking for a money left therein, cleaning the route 20 of dust. A safe return of the sheet C assures a route recovery, permitting a restarted transaction.

After a round travel, the check sheet C is discharged by the arm member 41, so that released dust is driven into the dust collection chamber 33 by blows B from the blower 34.

Incidentally, the chamber member 30 may be installed one or more places in the conveyor route 20.

Moreover, a check start command may be automatically issued at predetermined intervals for a routine check and a routine cleaning. A periodical cleaning may prevent an undesirable accumulation of paper dust, effectively reducing a frequency of erroneous sensing.

As will be seen, in an ATM according to the invention, a check sheet for checking a conveyor route for a potential jam is charged with electricities of a polarity, permitting a concurrent use for cleaning the route of dust, effectively reducing a frequency of erroneous actions that otherwise might be caused by dust accumulated on a photo sensor in the conveyor route.

Further, a possible recycling of a check sheet permits a frequent cleaning as well as a frequent jam check, thus resulting in an effective reduction of paper dust that otherwise would be difficult.

While the present invention has been described in its preferred embodiments with reference to the accompanying drawings, it will be appreciated that various changes and modifications can be made by those skilled in the art without departing from the spirit and scope of the present invention.

What is claimed is:

1. An automatic teller machine comprising:

a teller member for identifying paper money consisting of one of paper money incoming from outside the machine and paper money outgoing from inside the machine;

a safe member composed of one of a first safe for storing therein the paper money and a second safe for supplying therefrom the paper money;

a conveyor route composed of a money conveyor for conveying the paper money between the teller member and the safe member, and a route member for enclosing the money conveyor;

a check sheet member conveyable by the money conveyor for checking the conveyor route for a jam; and a charge circuit means for charging the check sheet member with electricity.

2. An automatic teller machine according to claim 1, wherein the automatic teller machine further comprises a loader means for loading the check sheet member on the money conveyor, and an unloader means for unloading the check sheet member from the money conveyor;

wherein the charge circuit means charges the check sheet member with electricity having a first polarity, before the loader means loads the check sheet member on the money conveyor so that the charged check sheet member travels the conveyor route; and wherein the unloader means unloads the check sheet member from the money conveyor, and thereafter the charge circuit means charges the check sheet member with electricity having a second polarity opposite to the first polarity.

3. An automatic teller machine comprising:

a money placement member operative for placing thereon first paper money incoming from outside of the machine;

a money discriminator operative for executing a first combination of decisions on a genuineness and a kind of the first paper money to identify the first paper money as second paper money reservable in the machine;

a safe member for keeping therein the second paper money as reserved paper money pickable as third paper money;

the money discriminator being further operative for executing a second combination of decisions on a genuineness and a kind of the third paper money to identify the third paper money as fourth paper money available for a delivery to outside the machine;

a first hold member for temporarily holding therein the fourth paper money as fifth paper money secured for the delivery;

a second hold member for holding therein the fifth paper money as sixth paper money for the delivery;

the money placement member being further operative for placing thereon the sixth paper money to effect the delivery;

a conveyor route composed of:

a money conveyor for conveying the first paper money from the money placement member to the money discriminator, the second paper money from the money discriminator to the safe member, the third paper money from the safe member to the money discriminator, the fourth paper money from the money discriminator to the first hold member, the fifth paper money from the first hold member to the second hold member and the sixth paper money from the second hold member to the money displacement member, and a route member for enclosing the money conveyor;

a check sheet member conveyable by the money conveyor for checking the conveyor route for a jam;

a sheet accommodation member for accommodating therein the check sheet member;

a charge providing means for charging the check sheet member in the sheet accommodation member; and a loading member for loading the check sheet member from the sheet accommodation member to the money conveyor.

4. An automatic teller machine according to claim 3, further comprising:

an unloading member for unloading the check sheet member from the money conveyor into the sheet accommodation member; and a charge canceling means for canceling the charge of the check sheet member.

5. An automatic teller machine according to claim 4, further comprising:

a blower for blowing accumulated dust off the check sheet member, as it is unloaded from the money conveyor; and a dust collector for collecting the blown dust.

6. An automatic teller machine according to claim 5, wherein the charge canceling means comprises:

a sweep member for sweeping a surface of the check sheet member; and a control circuit for charging the sweep member with a polarity-controlled charge.

7. An automatic teller machine according to claim 6, wherein the charge providing means comprises the charge canceling means.

8. An operation method for an automatic teller machine including a teller member for identifying a paper money consisting of one of paper money incoming from outside the machine and paper money outgoing from inside the machine, a safe member composed of one of a first safe for storing therein the paper money and a second safe for supplying therefrom the paper money, and a conveyor route composed of a money conveyor for conveying the paper money between the teller member and the safe member and a route member for enclosing the money conveyor, the operation method comprising the steps of:

charging a check sheet member with electricity; and conveying the check sheet member via the money conveyor and checking the conveyor route for a jam.

9. An operation method according to claim 8, wherein the charging step comprises the steps of:

charging the check sheet member with the electricity having a first polarity;

loading the check sheet member on the money conveyor so that the check sheet member travels the conveyor route;

unloading the check sheet member from the money conveyor; and charging the check sheet member with electricity having a second polarity opposite to the first polarity.

* * * * *